United States Patent
Arai et al.

(10) Patent No.: US 11,415,596 B2
(45) Date of Patent: Aug. 16, 2022

(54) SCANNING PROBE MICROSCOPE AND ANALYSIS METHOD

(71) Applicant: Shimadzu Corporation, Kyoto (JP)

(72) Inventors: Hiroshi Arai, Kyoto (JP); Masato Hirade, Kyoto (JP)

(73) Assignee: Shimadzu Corporation, Kyoto (JP)

(*) Notice: Subject to any disclaimer, the term of this patent is extended or adjusted under 35 U.S.C. 154(b) by 211 days.

(21) Appl. No.: 16/959,392

(22) PCT Filed: Jan. 29, 2018

(86) PCT No.: PCT/JP2018/002693
§ 371 (c)(1),
(2) Date: Jun. 30, 2020

(87) PCT Pub. No.: WO2019/146103
PCT Pub. Date: Aug. 1, 2019

(65) Prior Publication Data
US 2021/0055326 A1    Feb. 25, 2021

(51) Int. Cl.
*G01Q 30/06*    (2010.01)

(52) U.S. Cl.
CPC .................... *G01Q 30/06* (2013.01)

(58) Field of Classification Search
CPC .................................................... G01Q 30/06
USPC .............. 850/1, 2, 3, 4, 5, 6, 7, 8, 9, 10, 11
See application file for complete search history.

(56) References Cited

U.S. PATENT DOCUMENTS

| | | | | |
|---|---|---|---|---|
| 5,497,656 A | * | 3/1996 | Kado | G01Q 10/065 977/851 |
| 2003/0234358 A1 | * | 12/2003 | Higgins | G01Q 10/06 250/306 |

(Continued)

FOREIGN PATENT DOCUMENTS

| | | |
|---|---|---|
| JP | 2006-138655 A | 6/2006 |
| JP | 2014-211372 A | 11/2014 |

OTHER PUBLICATIONS

Written Opinion for PCT application PCT/JP2018/002693 dated Apr. 24, 2018, submitted with a machine translation.

*Primary Examiner* — Nicole M Ippolito
(74) *Attorney, Agent, or Firm* — Muir Patent Law, PLLC

(57) ABSTRACT

A scanning probe microscope 1 is provided with a control unit 15. The control unit 15 includes a signal acquisition processing unit 151, an image acquisition processing unit 152, a scanning condition change processing unit 154, a scanning processing unit 155, and a noise determination processing unit 156. In the scanning probe microscope 1, when removing noise included in a surface image of a sample, the scanning condition change processing unit 154 changes a scanning condition. And, the signal acquisition processing unit 151 acquires an output signal from a detection unit 12. The image acquisition processing unit 152 acquires a surface image of a sample S based on the output signal. The noise determination processing unit 156 determines whether or not noise is inclined in the output signal contains noise based on the change in the output signal or the change in the surface image of the sample S when the scanning condition is changed by the scanning condition change processing unit 154. Therefore, if noise is included in the output signal, it is possible to correctly determinate the fact.

8 Claims, 6 Drawing Sheets

(56) References Cited

U.S. PATENT DOCUMENTS

| 2018/0052186 A1* | 2/2018 | Su | G01Q 60/32 |
| 2018/0306837 A1* | 10/2018 | Sadeghian Marnani | G01Q 60/32 |
| 2020/0408806 A1* | 12/2020 | Bhargava | G01Q 60/38 |

* cited by examiner

SCANNING PROBE MICROSCOPE AND ANALYSIS METHOD

TECHNICAL FIELD

The present invention relates to a scanning probe microscope for acquiring a surface image of a sample by relatively moving a cantilever along a surface of the sample and an analysis method using the scanning probe microscope.

BACKGROUND OF THE INVENTION

Conventionally, as a device for inspecting a fine surface shape of a sample, a scanning probe microscope has been used. In a scanning probe microscope, scanning is performed by relatively moving a probe with respect to a surface of a sample to detect a change in a physical quantity (a tunneling current, an interatomic force, etc.) acting between the probe and the sample surface during the scanning. Then, the relative position of the probe is feedback-controlled so as to keep the physical quantity during the scanning constant, whereby the surface shape of the sample can be measured based on the feedback amount (see, e.g., Patent Document 1).

In such a scanning probe microscope, a cantilever is configured as a very small member having, for example, a length of about 100 µm to about 500 µm and a width of about several tens of µm. In a scanning probe microscope, a cantilever is relatively moved with respect to a surface of a sample, thereby acquiring a minute surface image of the sample with high resolution.

Prior Art Document

Patent Document

Patent Document 1: Japanese Unexamined Patent Application Publication No. 2014-211372

SUMMARY OF THE INVENTION

Problems to be Solved by the Invention

In a conventional scanning probe microscope as described above, there was a problem that an image which does not actually exist is included in an acquired image. Specifically, since the scanning probe microscope acquires an image with high resolution, it is susceptible to the influence of the surroundings (external noise) when observing. For example, when observing a sample using a scanning probe microscope, in cases where floor vibrations, airflow due to air conditioning, power supply noise, etc., are occurring, an image (image due to noise) which does not actually exist appears like a pattern in the acquired image. In this case, since an image representing the actual sample surface and an image caused by noise are mixed in the image, a user cannot correctly perform the observation in some cases.

It is an object of the present invention to provide a scanning probe microscope and an analysis method capable of correctly determining whether or not noise is included in an output signal.

Means for Solving the Problem (1) A scanning probe microscope according to the present invention is provided with a scanning processing unit, an image acquisition processing unit, a scanning condition change processing unit, and a noise determination processing unit. The scanning processing unit is configured to perform scanning in a main scanning direction and in a sub-scanning direction by relatively moving a cantilever along a surface of a sample. The image acquisition processing unit is configured to acquire a surface image of the sample based on an output signal corresponding to a deflection amount of the cantilever during the scanning. The scanning condition change processing unit is configured to change a scanning condition including at least one of a scanning speed and a scanning range in the main scanning direction. The noise determination processing unit is configured to determine whether or not noise is included in the output signal based on a change in the output signal or a change in a surface image of the sample when the scanning condition is changed by the scanning condition change processing unit.

When observing a sample by using a scanning probe microscope, in cases where floor vibrations, airflow due to air conditioning, power supply noise, or the like, is occurring, an image that does not actually exist in the acquired image appears as a pattern. This is due to noise included in an output signal.

Further, in a scanning probe microscope, when scanning is performed by changing the scanning condition, in the output signal, the signal representing the actual sample surface and the signal caused by noise change in a different manner. Similarly, in the surface image, the image representing the actual sample surface and the image caused by noise change in a different manner.

According to the above-described configuration of the present invention, the noise determination processing unit determines whether or not noise is included in the output signal based on the output signal corresponding to the deflection amount of the cantilever or the change of the surface image acquired by the image acquisition processing unit when the scanning condition is changed. Therefore, in cases where noise is included in the output signal, it is possible to correctly determine that noise is included in the output signal.

(2) Further, the noise determination processing unit may determine that noise is included in the output signal if a periodic feature included in the output signal or a periodic feature included in the surface image of the sample changes when the scanning speed is changed by the scanning condition change processing unit.

In a scanning probe microscope, when scanning is performed by changing the scanning speed, in the output signal, the signal representing the actual sample surface does not change and the signal (periodic feature) caused by noise changes. Similarly, in the surface image, the image representing the actual sample surface does not change, and the image (periodic feature) caused by noise changes. According to the above-described configuration, by changing the scanning speed by the scanning condition change processing unit, it is determined whether or not noise is included in the output signal by the noise determination processing. Therefore, it is possible to correctly determined that noise is included in the output signal by simple control processing.

(3) Further, the noise determination processing unit may determine that noise is included in the output signal if a periodic feature included in the output signal or a periodic feature included in the surface image of the sample does not change when the scanning range is changed by the scanning condition change processing unit.

In a scanning probe microscope, when scanning is performed by changing the scanning range, in the output signal, the signal representing the actual sample surface changes, and the signal (periodic feature) caused by noise does not change. Similarly, in the surface image, the image representing the actual sample surface changes, and the image (periodic feature) caused by noise remains unchanged.

According to the above-described configuration, by changing the scanning range by the scanning condition change processing unit, it is determined whether or not noise is included in the output signal by the noise determination processing. Therefore, it is possible to correctly determine that noise is included in the output signal by simple control processing.

(4) The scanning probe microscope may further include a noise removal processing unit. The noise removal processing unit is configured to remove noise from the acquired surface image of the sample when it is determined by the noise determination processing unit that noise is included in the output signal.

According to such a configuration, it is possible to acquire the surface image derived only from the surface shape of the sample. As a result, it is possible to correctly perform the observation of the sample.

(5) The analysis method according to the present invention is an analysis method using a scanning probe microscope in which a cantilever is relatively moved along a surface of a sample to perform scanning in a main scanning direction and in a sub-scanning direction to acquire a surface image of the sample based on an output signal corresponding to a deflection amount of the cantilever during scanning. The analysis method includes a scanning condition change step and a noise determination step. In the scanning condition change step, a scanning condition including at least one of a scanning speed in the main scanning direction and a scanning range is changed. In the noise determination step, it is determined whether or not noise is included in the output signal based on a change in the output signal or a change in the surface image of the sample when the scanning condition is changed by the scanning condition change step.

(6) In the noise determination step, it may be determined that noise is included in the output signal if a periodic feature included in the output signal or a periodic feature included in the surface image of the sample changes when the scanning speed is changed by the scanning condition change step.

(7) In the noise determination step, it may be determined that noise is included in the output signal if a periodic feature included in the output signal or a periodic feature included in the surface image of the sample does not change when the scanning range is changed by the scanning condition change step.

(8) Further, the analysis method may further include a noise removal step. In the noise removal step, noise is removed from the acquired surface image of the sample when it is determined that noise is included in the output signal in the noise determination step.

Effects of the Invention

According to the present invention, in the scanning probe microscope, the noise determination processing unit determines whether or not noise is included in the output signal based on the output signal corresponding to the deflection amount of the cantilever or the change of the surface image acquired by the image acquisition processing unit when the scanning condition is changed. Therefore, when noise is included in the output signal, it is possible to correctly determine that noise is included in the output signal.

EMBODIMENTS FOR CARRYING OUT THE INVENTION

1. General Configuration of Scanning Probe Microscope

Figure 1:
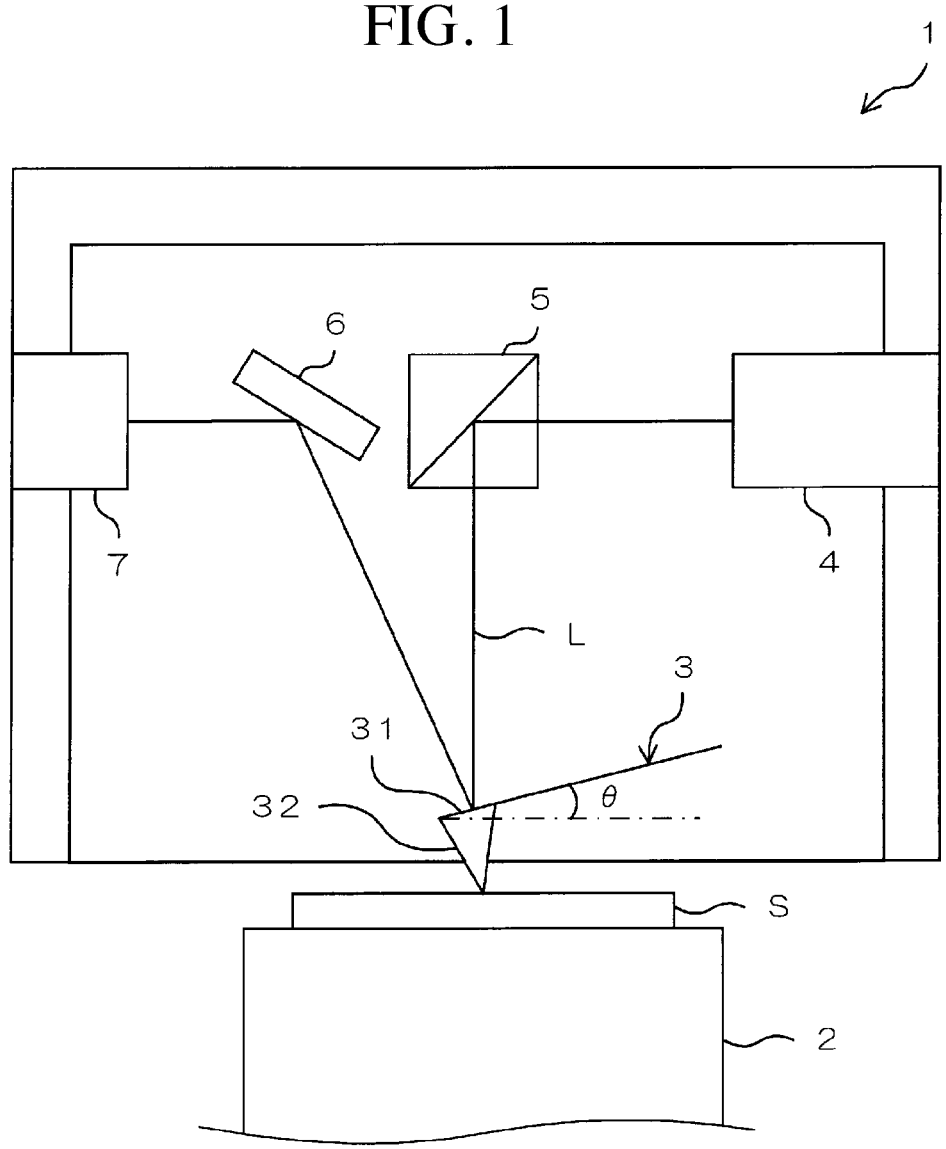
FIG. 1 is a schematic diagram showing a configuration example of a scanning probe microscope according to a first embodiment of the present invention.

FIG. 1 is a schematic diagram showing a configuration example of a scanning probe microscope 1 according to an embodiment of the present invention. The scanning probe microscope (SPM) 1 is provided with, for example, a stage 2, a cantilever 3, a light irradiation unit 4, a beam splitter 5, a mirror 6, and a light receiving unit 7, and is configured to acquire an uneven image of a surface of a sample S by scanning the cantilever 3 with respect to the surface of the sample S.

In the scanning probe microscope 1, the sample S is placed on the stage 2. In the scanning probe microscope 1, by displacing one of the stage 2 and the cantilever 3, the cantilever 3 is relatively moved along the surface of the sample S.

For example, the stage 2 is provided with a piezoelectric element (not shown) on the outer peripheral surface thereof. In the case of displacing (deforming) the stage 2, a voltage is applied to the piezoelectric element. As a result, the stage 2 is appropriately deformed, and the position of the sample S on the stage 2 is changed.

The cantilever 3 is provided at the position facing the sample S on the stage 2. The cantilever 3 is, for example, a very small elongated member having a length of about 150 μm and a width of about 30 μm to about 40μm and is cantilevered. A reflection surface 31 is formed at the distal end of the free end of the cantilever 3. In the cantilever 3, on the surface of opposite to the reflection surface 31, a probe 32 is provided. By moving the probe 32 along the surface of the sample S, an uneven image of the surface of the sample S can be acquired.

The light irradiation unit 4 is provided with, for example, a laser source such as a semiconductor laser. The beam splitter 5 is arranged at a position where the light from the light irradiation unit 4 is incident. The light from the light irradiation unit 4 is incident on the cantilever 3 through the beam splitter 5.

Note that in the optical path from the light irradiation unit 4 to the cantilever 3, for example, another optical member, such as, e.g., a collimatte lens and a focus lens, may be provided. In this case, after the irradiation light from the light irradiation unit 4 is converted into parallel light by the collimatte lens, the parallel light can be condensed by a focus lens and guided to the cantilever 3.

In addition to the beam splitter 5, the collimatte lens, the focus lens, and the like constitute an optical system for guiding the irradiation light from the light irradiation unit 4 to the cantilever 3. However, the configuration of the optical system is not limited to these, and may be a configuration in which at least one of the above-described optical members is not provided.

The mirror 6 directs the light reflected by the reflection surface 31 of the cantilever 3 to the light receiving unit 7 by re-reflecting the light. The light receiving unit 7 is configured to include a photodiode such as a 4-division photodiode.

In the scanning probe microscope 1, when observing the sample S, the probe 32 of the cantilever 3 is moved with respect to the surface of the sample S to perform scanning along the surface of the sample S in a state in which the sample S is set on the stage 2. During this scanning, the physical quantity, such as the interatomic force acting between the probe 32 of the cantilever 3 and the surface of the sample S, changes.

Further, a laser beam is emitted from the light irradiation unit 4. The light from the light irradiation unit 4 is directed through the beam splitter 5 to the reflection surface 31 of the cantilever 3. The reflected light reflected by the reflection surface 31 of the cantilever 3 is reflected again by the mirror 6 and received by the light receiving unit 7.

Here, the reflection surface 31 of the cantilever 3 is inclined at a predetermined inclination angle $\theta$ with respect to a direction perpendicular to the optical axis L of the irradiation light from the light irradiation unit 4. Therefore, when the probe 32 of the cantilever 3 is moved along the unevenness of the sample S, the cantilever 3 deflects, so that the tilt angle $\theta$ of the reflection surface 31 changes. At this time, the position at which the light receiving unit 7 receives the reflected light from the reflection surface 31 changes. Therefore, based on the change in the light received position of the reflected light at the light receiving unit 7, the change in the physical quantity acting between the probe 32 of the cantilever 3 and the sample S during the scanning can be detected. And, the relative position of the probe 32 of the cantilever 3 is feedback-controlled so as to keep the physical quantity constant, and the surface shape of the sample S is measured (the surface image is acquired) based on the feedback amount.

When observing the sample S using the scanning probe microscope 1 as described above, floor vibrations, airflow by air conditioning, or the like may occur, so that noise may be included in the signal to be acquired. In this scanning probe microscope 1, in order to discriminate and remove the noise, the following configuration is provided, and the following control operation is performed.

2. Electrical Configuration of Control Unit and its Surrounding Components

Figure 2:
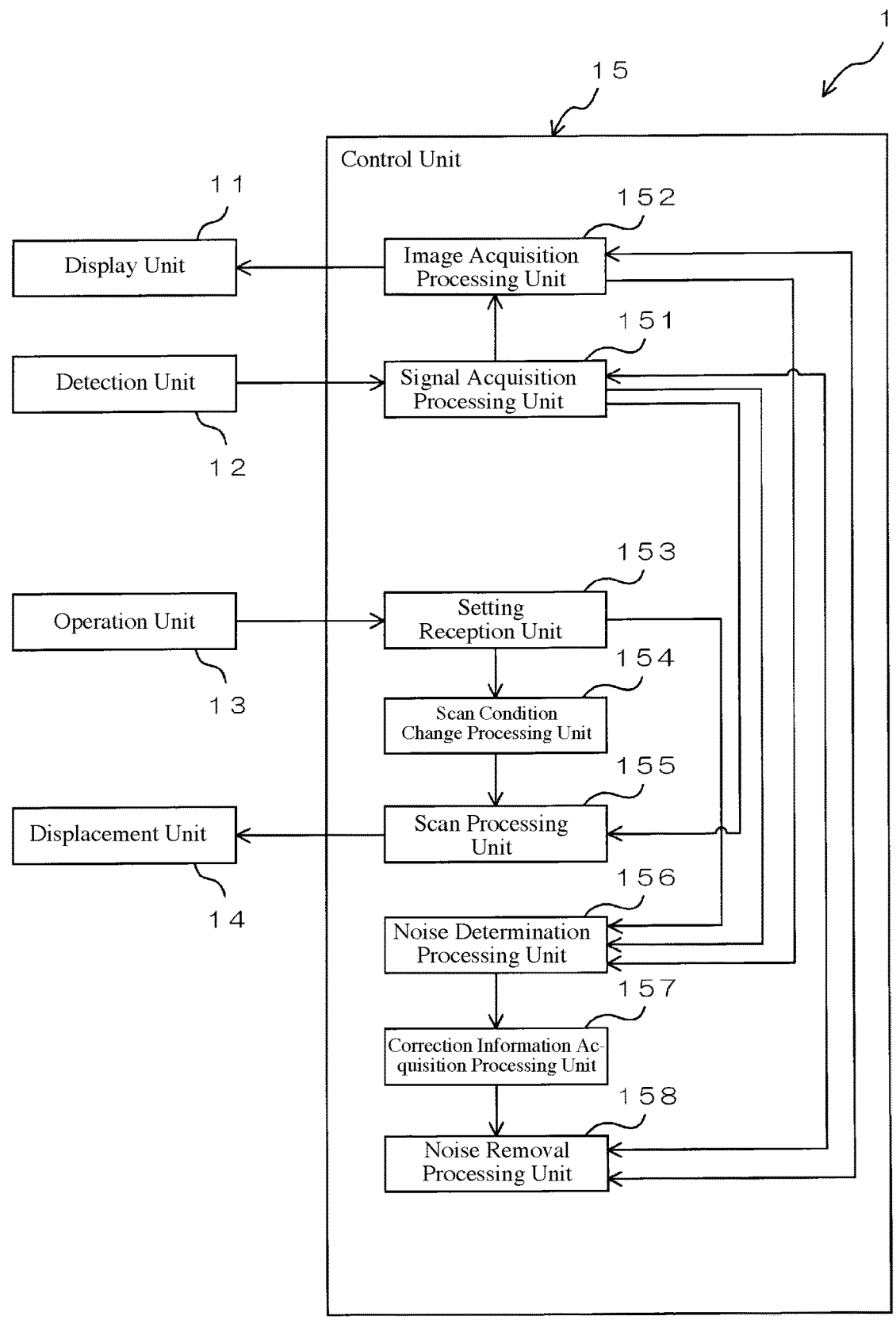
FIG. 2 is a block diagram showing an electric configuration of a control unit and its peripheral members.

FIG. 2 is a diagram showing the electric configuration of the control unit 15 of the scanning probe microscope 1 and its peripheral members. The scanning probe microscope 1 is provided with a display unit 11, a detection unit 12, an operation unit 13, a displacement unit 14, a control unit 15, and the like as an electric configuration.

The display unit 11 is composed of, for example, a liquid crystal display. The detection unit 12 detects the feedback amount of the relative position of the probe 32 of the cantilever 3 and outputs a signal based on the detected result. That is, the detection unit 12 outputs a signal (output signal) corresponding to the deflection amount of the cantilever 3.

The operation unit 13 is configured to include, for example, a keyboard and a mouse. The displacement unit 14 is for displacing the relative position of the cantilever 3 with respect to the sample S on the stage 2 to perform scanning in the main scanning direction and in the sub-scanning direction. Specifically, the displacement unit 14 performs the operation of displacing the stage 2 in a state in which the position of the cantilever 3 is fixed, or the operation of displacing the cantilever 3 in a state in which the position of the stage 2 is fixed.

The control unit 15 is configured to include, for example, a CPU (Central Processing Unit). The display unit 11, the detection unit 12, the operation unit 13, the displacement unit 14, and the like are electrically connected to the control unit 15. The control unit 15 functions as a signal acquisition processing unit 151, an image acquisition processing unit 152, a setting reception unit 153, a scanning condition change processing unit 154, a scanning processing unit 155, a noise determination processing unit 156, a correction information acquisition processing unit 157 and a noise removal processing unit 158 by the CPU executing programs.

The signal acquisition processing unit 151 acquires the output signal from the detection unit 12. The image acquisition processing unit 152 acquires the surface image of the sample S based on the output signal of the detection unit 12 acquired by the image acquisition processing unit 151. The setting reception unit 153 accepts various settings based on the user's operation of the operation unit 13. Specifically, the setting reception unit 153 accepts the noise removal setting.

The scanning condition change processing unit 154 changes the condition of the scanning in the scanning probe microscope 1 based on the acceptance of the setting by the setting reception unit 153. The scanning processing unit 155 operates the displacement unit 14 to perform the scanning in the main scanning direction and in the sub-scanning direction based on the scanning condition after the change of the scanning by the scanning condition change processing unit 154. Further, the scanning processing unit 155 operates the displacement unit 14 to perform scanning in the main scanning direction and in the sub-scanning direction based on the output signal of the detection unit 12 acquired by the signal acquisition processing unit 151.

Depending on whether the setting reception unit 153 has accepted the setting, the noise determination processing unit 156 determines whether noise is included in the output signal based on the image acquired by the image acquisition processing unit 152 or the output signal acquired by the signal acquisition processing unit 151. The correction information acquisition processing unit 157 acquires the information (correction information) for removing noise based on the determination result of the noise determination processing unit 156.

The noise removal processing unit 158 removes the noise from the surface image of the sample S acquired by the image acquisition processing unit 152 based on the correction information acquired by the correction information acquisition processing unit 157.

3. Control Operation of Control Unit

Figure 3:
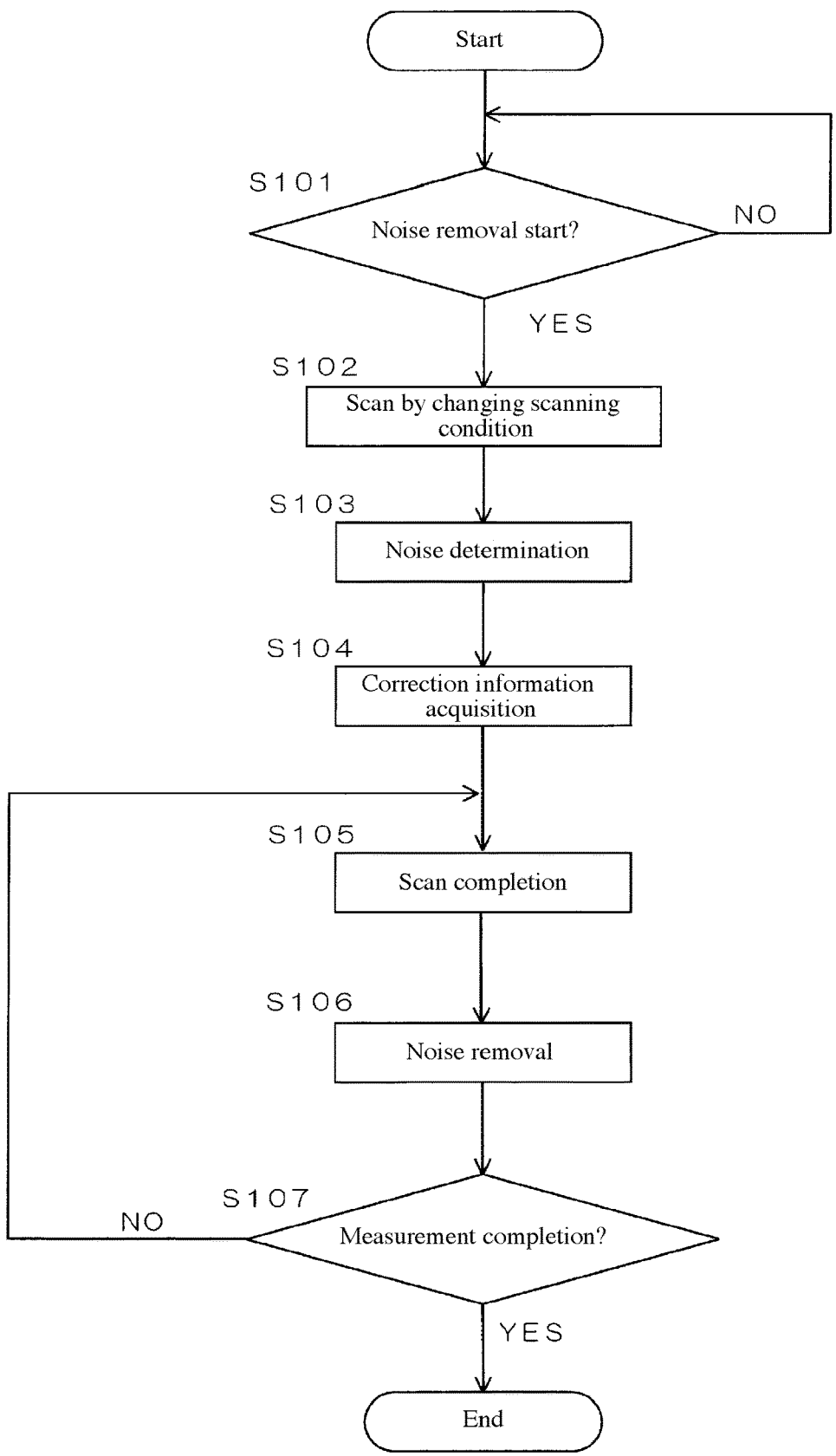
FIG. 3 is a flowchart showing an example of a control operation by a control unit.

FIG. 3 is a flowchart showing an example of the control operation by the control unit 15. When acquiring the surface image of the sample S in the scanning probe microscope 1, first, the detection unit 12 detects the feedback amount of the relative position of the probe 32 of the cantilever 3. Then, the signal acquisition processing unit 151 acquires the output signal from the detection unit 12. The image acquisition processing unit 152 also starts to acquire the surface image of the sample S based on the output signal acquired by the signal acquisition processing unit 151.

At this time, floor vibrations, airflow due to air conditioning, or the like may occur, and noise may be included in the output signal from the detection unit 12. In this case, noise is included in the surface image of the sample S acquired by the image acquisition processing unit 152.

In this case, the user checks the surface image of the sample S displayed on the display unit 11 to determine whether there is a possibility that noise is included. When the user determines that noise is included in the surface image of the sample S, the user operates the operation unit 13 and performs an input operation to start the noise removal processing (YES in Step S101). Note that the noise removal processing may be automatically started regardless of the user input operation (setting operation). For example, the noise removal processing may be initiated automatically depending on the periodic feature included in the surface image of the sample S.

Figure 4A:
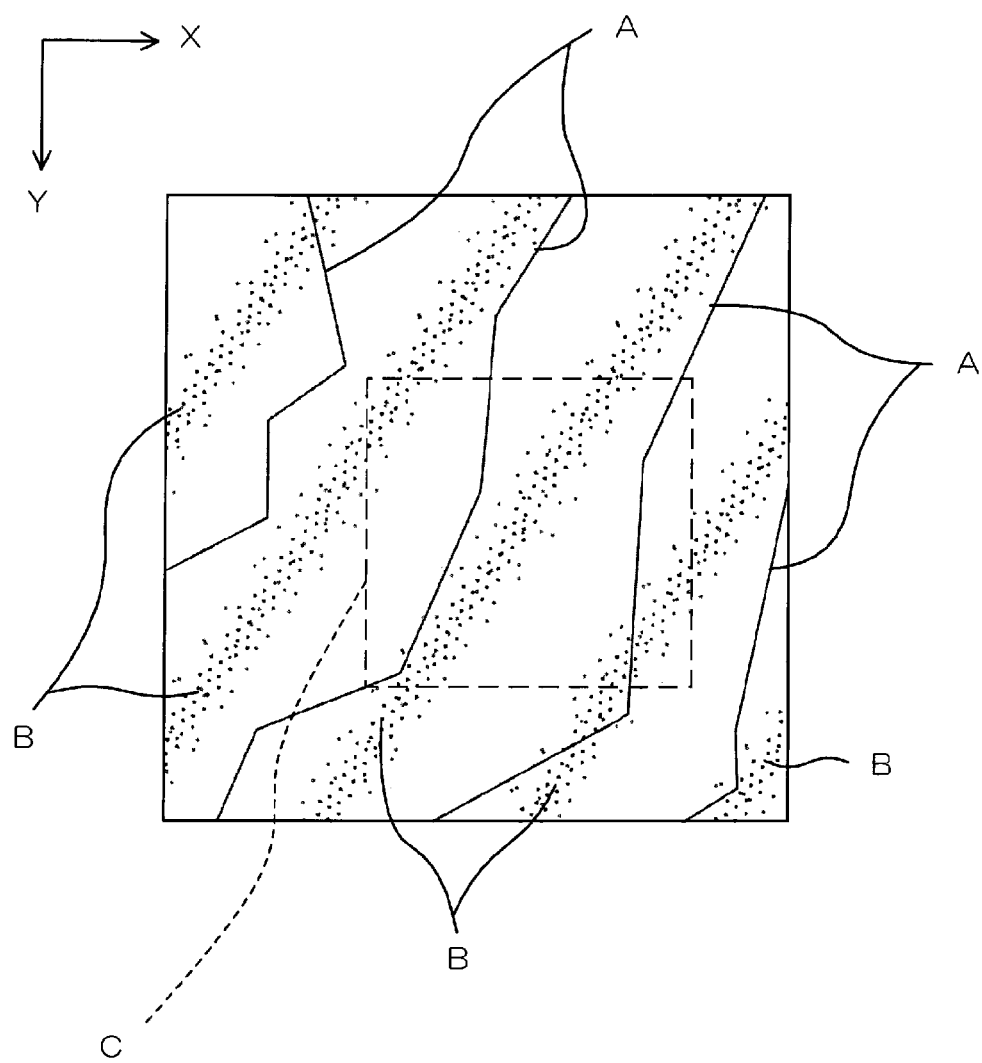
FIG. 4A is a diagram showing an example of a surface image of a sample acquired by a scanning probe microscope, and shows a surface image before initiating noise removal processing.

FIG. 4A is a diagram showing an example of the surface image of the sample S acquired in the scanning probe microscope 1, and shows a surface image before initiation of the noise removal processing. In FIG. 4A, the image (feature) appearing as a surface image of the sample S is denoted by A, and the image (feature) appearing as noise is denoted by B.

The X-axis direction in FIG. 4A is a main scanning direction, and the Y-axis direction is a sub-scanning direction. In the scanning probe microscope 1, the operation in which the surface of the sample S and the cantilever 3 are relatively moved linearly (along the line) in the main scanning direction and the operation in which the relative position between the surface of the sample S and the cantilever 3 is shifted by one line in sub-scanning direction are alternately performed. That is, the moving direction when the relative position between the sample S and the cantilever 3 is changed linearly (along the line) is the main scanning direction, and the direction perpendicular to the main scanning direction is the sub-scanning direction.

As shown in FIG. 4A, the image A is an aperiodic image (feature), whereas the image B is a periodic image (feature). The fact that the image B appears as a periodic feature is caused by the periodic generation of floor vibrations, airflow due to air conditioning, and the like, which cause noise.

In the scanning probe microscope 1, when the image shown in FIG. 4A is displayed on the display unit 11 as a result of starting the acquisition of the surface image of the sample S, the user determines whether there is a possibility that noise is included in the images A and B. If, for example, like the image B, a periodic image (periodic feature) is included in the surface image, it is determined that there is a high possibility that the image is noise. In such a case, the user performs an input operation (setting operation) in Step S101 to start the noise removal processing.

Then, the setting reception unit 153 accepts the setting by the user. The scanning condition change processing unit 154 changes the scanning condition in the scanning probe microscope 1 in response to the acceptance of the setting by the setting reception unit 153 (Step S102: Scanning condition change step). After the acceptance of the noise removal setting by the setting reception unit 153, the noise determination processing unit 156 determines whether noise has occurred based on the surface image of the sample S acquired by the image acquisition processing unit 152 (Step S103: Noise determination step).

Figure 4B:
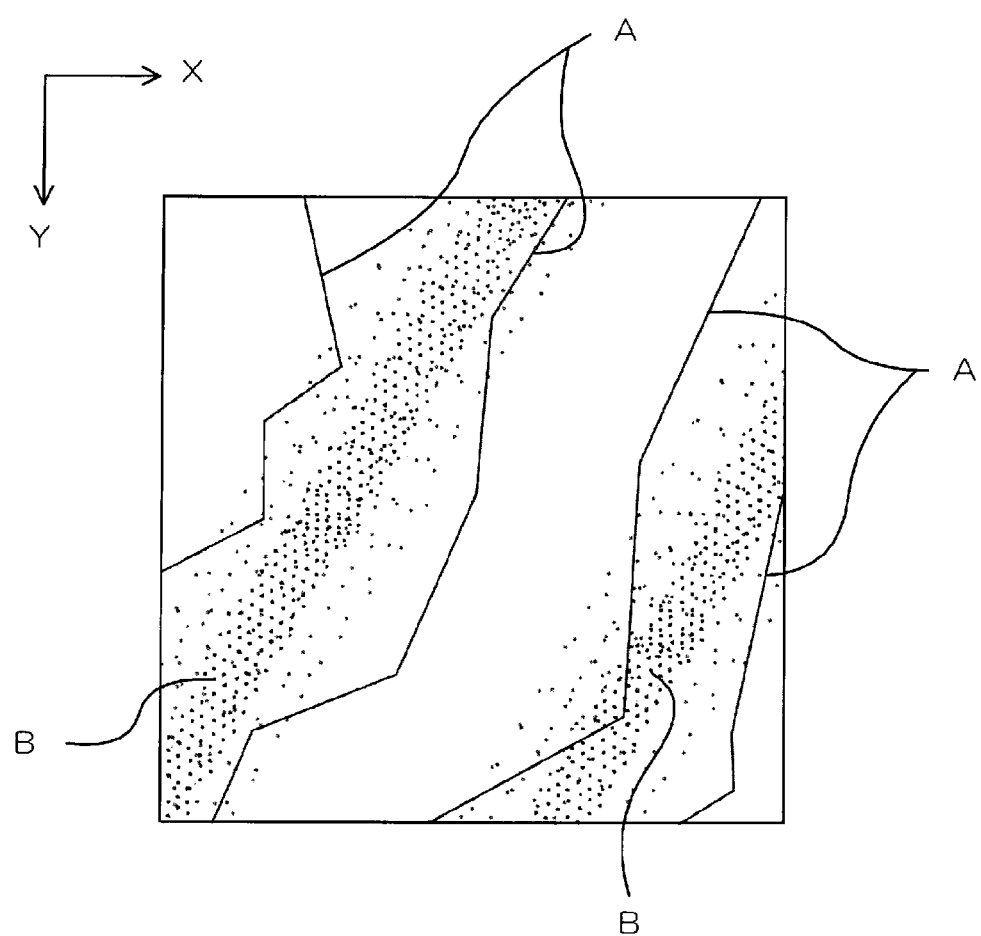
FIG. 4B is a diagram showing an example of a surface image of a sample acquired by a scanning probe microscope, and shows a surface image after a change of a scanning speed.

Specifically, the scanning condition change processing unit 154 changes the displacement speed (scanning speed in the scanning probe microscope 1) of the relative position of the cantilever 3 relative to the sample S. Then, with the changed condition, the signal acquisition processing unit 151 acquires the output signal from the detection unit 12 again, and the image acquisition processing unit 152 acquires the surface image of the sample S again based on the output signal. FIG. 4B is a diagram showing an example of the surface image of the sample S acquired by the scanning probe microscope 1, and shows the surface image after the change of the scanning speed.

As shown in FIG. 4B, in the surface image of the sample S acquired after the change of the scanning speed, the image A remains unchanged, while the image B has been changed. In this case, the scanning condition change processing unit 154 changes the scanning condition so that the displacement speed of the relative position of the cantilever 3 relative to the sample S becomes first (the scanning speed becomes a high speed). Based on this condition, the surface image of the sample S has been acquired. Comparing FIG. 4A with FIG. 4B, in FIG. 4B, the interval of the images B appearing periodically has been increased. This is because, as a result of the increased scanning speed, the intervals at which noise appears in the signal acquired by the signal acquisition processing unit 151 have increased. On the other hand, the images A are derived from the surface shape of the sample S and do not change regardless of the scanning speed change. Note that the scanning condition change processing unit 154 may change the scanning condition so that the scanning speed decreases. In this case, the intervals of the noise image appeared in the surface image decrease.

Then, the noise determination processing unit 156 determines that noise is included in the output signal from the detection unit 12 based on the fact that the image B, which is a periodic feature included in the surface image, has changed when the scanning speed is changed by the scanning condition change processing unit 154 from the comparison of FIG. 4A and FIG. 4B. In this case, the noise determination processing unit 156 determines that the image B included in the surface image is an image representing noise.

The correction information acquisition processing unit 157 acquires correction information to remove noise based on that the noise determination processing unit 156 has determined (Step S104). Specifically, the correction information acquisition processing unit 157 generates a frequency filter for removing the image B determined as noise by the noise determination processing unit 156. Further, the scanning processing unit 155 completes the scanning operation (Step S105).

The noise removal processing unit 158 then removes the image B, which is noise, from the surface image using the correction information (frequency filter) acquired in the correction information acquisition processing unit 157 (Step S106: Noise removal step).

Thereafter, if there is a subsequent sample S (No in Step S107), scanning is performed on the sample S, and then scanning is completed. And the signal acquisition processing unit 151 acquires the output signal from the detection unit 12. Further, the image acquisition processing unit 152 acquires the surface image of the sample S based on the output signal. Further, the noise removal processing unit 158 removes noise from the surface image acquired by the image acquisition processing unit 152 using the correction information (frequency filter) acquired by the correction information acquisition processing unit 157 in Step 104. Upon completion of the measurements for all samples S (Yes in Step S107), the control operation of the control unit 15 is completed.

Note that the noise determination processing unit 156 may determine whether or not noise is included in the output signal based on the change in the output signal from the detection unit 12 acquired by the signal acquisition processing unit 151 in Step S103. Specifically, the noise determination processing unit 156 may determine whether or not noise is included in the output signal based on the data representing the strength distribution of the output signal acquired by the signal acquisition processing unit 151. In this case, the noise determination processing unit 156 determines whether or not noise is included in the output signal from the fact that the signal representing the actual sample surface and the signal generated by noise change in a different manner in the output signal.

In this case, in Step S104, the correction information acquisition processing unit 157 generates a frequency filter for removing the signal determined as noise by the noise determination processing unit 156. Also, in Step S105, the noise removal processing unit 158 removes the signal determined as noise from the output signal by using the correction information (frequency filter) acquired in the correction information acquisition processing unit 157.

4. Effects (1) According to this embodiment, the scanning probe microscope 1 is provided with the control unit 15. The control unit 15 includes the signal acquisition processing unit 151, the image acquisition processing unit 152, the scanning condition change processing unit 154, the scanning processing unit 155, and the noise determination processing unit 156. In the scanning probe microscope 1, in the case of removing noise included in the surface image of sample S, the scanning condition change processing unit 154 changes the scanning condition (Step S102 of FIG. 2: Scanning condition change step). The noise determination processing unit 156 determines whether or not noise is included in the output signal based on the change in the output signal or the change in the surface image of the sample S when the scanning condition is changed by the scanning condition change processing unit 154 (Step S103: Noise determination step). Therefore, when noise is included in the output signal, it is possible to correctly determine the fact.

(2) Further, according to this embodiment, the noise determination processing unit 156 determines that noise is included in the output signal if a periodic feature included in the surface image or a periodic feature (image B in FIG. 4B) included in the surface image of the sample is changed when the scanning speed is changed by the scanning condition change processing unit 154.

That is, the noise determination processing unit 156 determines whether or not noise is included in the output signal, focusing on, when the scanning speed is changed, the fact that the feature representing the actual sample surface does not change and the feature (periodic feature) caused by noise changes in the output signal or the fact that the image representing the actual sample surface does not change and the image (periodic feature) caused by noise the change in surface image of the sample S. Therefore, it is possible to correctly determined that noise is included in the output signal with simple control processing.

(3) Further, according to this embodiment, in the scanning probe microscope 1, the control unit 15 includes the noise removal processing unit 158. The noise removal processing unit 158 removes the noise from the surface image of the sample S acquired when the noise determination processing unit 156 determines that noise is included in the output signal. Therefore, it is possible to acquire the surface image derived only from the surface shape of the sample S. As a result, it is possible to correctly perform the observation of the sample.

5. Second Embodiment

Figure 4C:
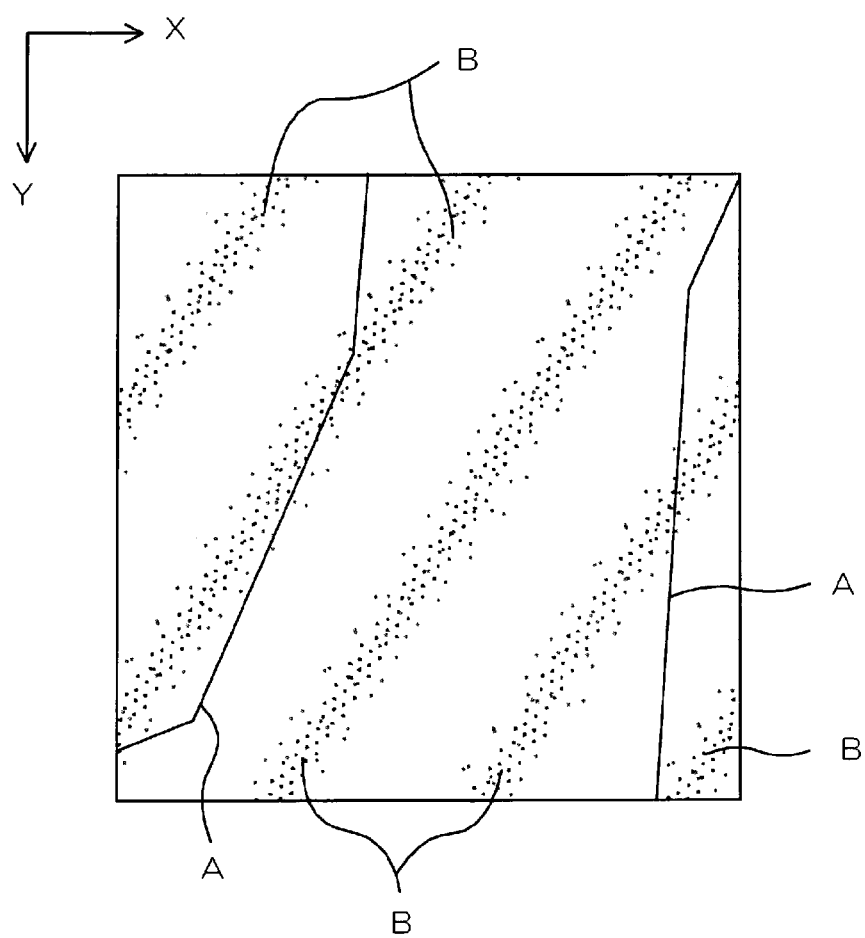
FIG. 4C is a diagram showing an example of a surface image of a sample acquired by a scanning probe microscope according to a second embodiment of the present invention, and shows a surface image after a change of a scanning range.

Hereinafter, another embodiment of the present invention will be described with reference to FIG. 4C. It should be noted that the same reference numerals as those described above are used to omit the descriptions of the same components as those of the first embodiment. FIG. 4C is a diagram showing an example of a surface image of a sample S acquired by the scanning probe microscope 1, and shows a surface image after the change of the scanning range. The region C in FIG. 4A corresponds to the surface image (entire image) of FIG. 4C.

In the second embodiment, in Step S102 of FIG. 3 described above, the scanning condition change processing unit 154 changes the displacement region (scanning range by the scanning probe microscope 1) of the relative position of the cantilever 3 with respect to the sample S. Then, with the changed condition, the signal acquisition processing unit 151 acquires the output signal from the detection unit 12 again, and the image acquisition processing unit 152 acquires the surface image of the sample S again based on the output signal.

Comparing FIG. 4A and FIG. 4C, the image B has not been changed and the image A has been changed in FIG. 4C which is a surface image of the sample S acquired after the change of the scanning range. In this instance, the scanning condition change processing unit 154 has changed the scanning condition so that the displacement region of the relative position of the cantilever 3 with respect to the sample S is reduced so that the scanning range is reduced. Based on this condition, the surface image of the sample S has been acquired.

Comparing FIG. 4A with FIG. 4C, the image A appears enlarged in FIG. 4C. On the other hand, in FIG. 4C, the image B has not been changed. This is due to the fact that even if the scanning range is decreased, the intervals (number of times) at which noise appears in the signal acquired by the signal acquisition processing unit 151 do not change as long as the scanning speed is constant. Note that the scanning condition of the scanning condition change processing unit 154 may be changed so as to increase the scanning range. Also in this case, the image of noise appeared in the surface image remains unchanged.

Further, the noise determination processing unit 156 determines that noise is included in the output signal from the detection unit 12 based on the fact that the image B, which is a periodic feature included in surface image, has not been changed when the scanning speed is changed by the scanning condition change processing unit 154 from the comparison of FIG. 4A and FIG. 4C. At this time, the noise determination processing unit 156 determines that the image B included in the surface image is an image representing noise.

Thereafter, in the same manner as in the first embodiment described above, the correction information is acquired by the correction information acquisition processing unit 157, and noise is removed from the surface image by the noise removal processing unit 158.

As described above, according to the second embodiment, the noise determination processing unit 156 determines that noise is included in the output signal when the periodic feature included in the output signal or the periodic feature (image B in FIG. 4C) included in the surface image of the sample S does not change when the scanning range is changed by the scanning condition change processing unit 154, That is, the noise determination processing unit 156 determines whether or not noise is included in the output signal, focusing on, when the scanning is performed by changing the scanning range, the fact that the feature representing the actual sample surface changes and the signal (periodic feature) caused by noise does not change in the output signal or the fact that the image representing the actual sample surface does not change and the image representing the actual sample surface changes and the image (periodic feature) caused by noise does not change in the surface image. Therefore, it is possible to correctly determined that noise is included in the output signal with simple control processing.

6. Modified Embodiments

In the above-described embodiments, when performing the removal processing of noise (in Step S102 of FIG. 3), the description is directed to the case in which the scanning condition change processing unit 154 changes either one of the scanning speed and the scanning range. However, the scanning condition change processing unit 154 may change both the scanning speed and the scanning range. Further, the scanning condition change processing unit 154 may acquire the surface image in a state in which one of the scanning speed and the scanning range is changed and thereafter acquire the surface image in a state in which the other of the scanning speed and the scanning range is changed.

In the above-described embodiments, the configuration in which the sample S and the cantilever 3 are relatively moved on the horizontal plane has been described. However, in the scanning probe microscope 1, it is possible to employ the configuration in which the sample S and the cantilever 3 are relatively moved in a vertical plane (the configuration in which the scanning measurement is performed in the height direction). In this case, the height direction (Z-axis direction) may be defined as a main scanning direction, and the above-described X-axis direction may be defined as a sub-scanning direction.

DESCRIPTION OF SYMBOLS

1: Scanning probe microscope
3: Cantilever
15: Control unit
32: Probe
151: Signal acquisition processing unit
152: Image acquisition processing unit
154: Scanning condition change processing unit
155: Scanning processing unit
156: Noise determination processing unit
158: Noise removal processing unit

The invention claimed is:

1. A scanning probe microscope comprising:
   a scanning processing unit configured to perform scanning in a main scanning direction and in a sub-scanning direction by relatively moving a cantilever along a surface of a sample;
   an image acquisition processing unit configured to acquire a surface image of the sample based on an output signal corresponding to a deflection amount of the cantilever during the scanning;
   a scanning condition change processing unit configured to change a scanning condition including at least one of a scanning speed and a scanning range in the main scanning direction; and
   a noise determination processing unit configured to determine whether or not noise is included in the output signal based on a change in the output signal or a change in the surface image of the sample when the scanning condition is changed by the scanning condition change processing unit,
   wherein the noise determination processing unit determines that noise is included in the output signal based on that an interval of a periodic feature included in the output signal or an interval of a periodic feature included in the surface image of the sample becomes large when the scanning speed is changed to a high speed by the scanning condition change processing unit or based on that the interval of the periodic feature included in the output signal or the interval of the periodic feature included in the surface image of the sample becomes small when the scanning speed is changed to a low speed by the scanning condition change processing unit.

2. The scanning probe microscope as recited in claim 1, further comprising:
   a noise removal processing unit configured to remove noise from the acquired surface image of the sample when it is determined by the noise determination processing unit that noise is included in the output signal.

3. An analysis method using a scanning probe microscope in which a cantilever is relatively moved along a surface of a sample to perform scanning in a main scanning direction and in a sub-scanning direction to acquire a surface image of the sample based on an output signal corresponding to a deflection amount of the cantilever during scanning, the analysis method comprising:
   a scanning condition change step of changing a scanning condition including at least one of a scanning speed in the main scanning direction and a scanning range; and
   a noise determination step of determining whether or not noise is included in the output signal based on a change in the output signal or a change in the surface image of the sample when the scanning condition is changed by the scanning condition change step,
   wherein in the noise determination step, it is determined that noise is included in the output signal based on that an interval of a periodic feature included in the output signal or an interval of a periodic feature included in the surface image of the sample becomes large when the scanning speed is changed to a high speed in the scanning condition change step or based on that the interval of the periodic feature included in the output signal or the interval of the periodic feature included in the surface image of the sample becomes small when the scanning speed is changed to a low speed in the scanning condition change step.

4. The analysis method as recited in claim 3, further comprising:
a noise removal step of removing noise from the acquired surface image of the sample when it is determined that noise is included in the output signal in the noise determination step.

5. A scanning probe microscope comprising:
a scanning processing unit configured to perform scanning in a main scanning direction and in a sub-scanning direction by relatively moving a cantilever along a surface of a sample;
an image acquisition processing unit configured to acquire a surface image of the sample based on an output signal corresponding to a deflection amount of the cantilever during the scanning;
a scanning condition change processing unit configured to change a scanning condition including at least one of a scanning speed and a scanning range in the main scanning direction; and
a noise determination processing unit configured to determine whether or not noise is included in the output signal based on a change in the output signal or a change in the surface image of the sample when the scanning condition is changed by the scanning condition change processing unit,
wherein the noise determination processing unit determines that noise is included in the output signal based on that an interval of a periodic feature included in the output signal or an interval of a periodic feature included in the surface image of the sample does not change when the scanning condition is changed by the scanning condition change processing unit so that the scanning range becomes small or when the scanning condition is changed by the scanning condition change processing unit so that the scanning range becomes large.

6. The scanning probe microscope as recited in claim 5, further comprising:
a noise removal processing unit configured to remove noise from the acquired surface image of the sample when it is determined by the noise determination processing unit that noise is included in the output signal.

7. An analysis method using a scanning probe microscope in which a cantilever is relatively moved along a surface of a sample to perform scanning in a main scanning direction and in a sub-scanning direction to acquire a surface image of the sample based on an output signal corresponding to a deflection amount of the cantilever during scanning, the analysis method comprising:
a scanning condition change step of changing a scanning condition including at least one of a scanning speed in the main scanning direction and a scanning range; and
a noise determination step of determining whether or not noise is included in the output signal based on a change in the output signal or a change in the surface image of the sample when the scanning condition is changed by the scanning condition change step,
wherein in the noise determination step, it is determined that noise is included in the output signal based on that an interval of a periodic feature included in the output signal or an interval of a periodic feature included in the surface image of the sample does not change when the scanning condition is changed in the scanning condition change step so that the scanning range becomes small or when the scanning condition is changed in the scanning condition change step so that the scanning range becomes large.

8. The analysis method as recited in claim 7, further comprising:
a noise removal step of removing noise from the acquired surface image of the sample when it is determined that noise is included in the output signal in the noise determination step.

* * * * *